United States Patent [19]
Wakita et al.

[11] Patent Number: 5,156,188
[45] Date of Patent: Oct. 20, 1992

[54] FLOW CONTROL VALVE

[75] Inventors: Ryozo Wakita; Yasunori Ichikawa; Kunio Mutoh, all of Kanagawa, Japan

[73] Assignee: Fuji Photo Film Co., Ltd., Kanagawa, Japan

[21] Appl. No.: 697,386

[22] Filed: May 9, 1991

[30] Foreign Application Priority Data

May 14, 1990 [JP] Japan .................. 2-121180

[51] Int. Cl.⁵ .............................. F16K 1/54
[52] U.S. Cl. ................... 137/625.3; 251/121
[58] Field of Search ........... 137/625.3; 251/121, 251/122

[56] References Cited

U.S. PATENT DOCUMENTS

| | | | |
|---|---|---|---|
| 2,014,314 | 9/1935 | Defenbaugh | 251/122 |
| 2,117,182 | 5/1938 | Lewis | 137/625.3 |
| 4,601,310 | 7/1986 | Phillips | 251/122 X |

FOREIGN PATENT DOCUMENTS

| | | | |
|---|---|---|---|
| 120565 | 11/1945 | Australia | 137/625.3 |
| 45599 | 5/1932 | Denmark | 137/625.3 |
| 58-121381 | 7/1983 | Japan | . |
| 64-35185 | 2/1989 | Japan | . |

*Primary Examiner*—Robert G. Nilson
*Attorney, Agent, or Firm*—Sughrue, Mion, Zinn, Macpeak & Seas

[57] ABSTRACT

A flow control valve includes: an inlet casing concentric to a spindle; an outlet casing coupled with the inlet casing, an inlet portion of the outlet casing having a countersunk edge part; a head having two notches in the surface of a cylindrical portion, the head being put into the outlet casing; and a disk shaped as a truncated cone which is continuously provided to the head, the disk coming into contact with the countersunk edge part.

6 Claims, 2 Drawing Sheets

THE NOTCH OF THE
LEFT SIDE IS LARGER
IN LENGTH THAN THAT
OF THE RIGHT SIDE

FLOW CONTROL VALVE

BACKGROUND OF THE INVENTION

The present invention relates to a flow control valve, particularly to a flow control valve capable of accurately controlling the flow rate of a fluid in a wide range.

A method of controlling the flow rate of a fluid by a needle valve has been known to public. However, the size of the body of a needle valve for controlling the flow rate of a fluid in a range from 0 l/min. to 100 l/min. is so large relative to that of piping upstream and downstream of the valve that the valve is hardly put in practical use. Besides, there is no linearity between the degree of opening of the needle valve and the flow rate.

Under such circumstances, a pneumatic automatic control valve such as a diaphragm valve and a butterfly valve, an electric automatic control valve such as a ball valve, the degree of opening of which is regulated, another electric automatic control valve, which regulates the cross-sectional area of a fluid passage as disclosed in the Japan Patent Application (OPI) No. 121381/83 (the term "OPI" as used herein means an "unexamined published application"), and so forth have been put in practical use as flow control valves.

For example, a flow control valve shown in FIG. 3 has been put in practical use. In the valve, the cross-sectional area of the opening between a valve seat 36 and a valve head 33 constituted by a disk made of a resin and shaped as a truncated cone is regulated. However, since the valve head 33 is similar in constitution to an ordinary open/close valve, a fluid flows at a relatively high rate through the flow control valve even if the degree of opening thereof is very small. In other words, the valve cannot control the flow rate of the fluid to be low. This is a problem. Besides, since the flow rate of the fluid is controlled in terms of the clearance between the valve seat 36 and the valve head 33 made of the resin disk, the valve head is deformed due to the contact thereof with the valve seat 36 in the long-period use of the valve so as to change the clearance to alter the flow rate. This is also a problem.

To solve the problems, the present applicant proposed a flow control valve as disclosed in the Japan Patent Application (OPI) No. 35185/89. The valve is characterized in that a valve head is moved up and down by an electric motor whose rotation is converted into the straight movement of the valve head through a rack-pinion mechanism and a coupling plate; a spindle is attached to the coupling plate so that the spindle is vertically moved as the coupling plate is vertically moved; an inlet casing concentric to the spindle, and an outlet casing coupled with the inlet casing are provided; the valve head, which is cylindrically or conically shaped, is provided under an open/close contact surface tapered downward and shaped as a truncated cone, and can be put into the outlet casing; the form of the valve head is determined to set the cross-sectional area of the opening between the surface of the head and a valve seat so that the ratio of the change in the flow rate of a fluid to the lift of the valve is relatively small and the relationship between the flow rate and the valve lift is linear; and the valve head is located in the inlet casing when the valve is fully opened. The valve is shown in FIGS. 4 and 5. The valve head 46 is put into the outlet casing 47 to change the size of the opening between the head and the casing so as to control the flow rate of the fluid. The open/close contact surface 45 shaped as a truncated cone comes into contact with the valve seat 48 when the valve is completely closed.

The flow control valve disclosed in the Japan Patent Application (OPI) No. 35185/89 is high in the accuracy of the control of the flow rate in a wide range. However, since the outlet casing 47, the valve seat 48, the valve head 46 and the open/close contact surface 45 are made of metals, it is difficult to tightly fit the valve seat and the contact surface on each other. In other words, a small gap is likely to be made between the valve seat 48 and the contact surface 45 to deteriorate the accuracy of the control of a low flow rate by the valve and make the complete closure thereof impossible, to render it necessary to further provide a stop valve for complete shutting. This is a problem.

The present invention was made in order to solve the problem. Accordingly, it is an object of the present invention to provide a flow control valve which is higher in the accuracy of the control of the flow rate of a fluid in a wide range even if the flow rate is low and which can be completely closed so as to make it unnecessary to further provide a valve for complete shutting.

SUMMARY OF THE INVENTION

The flow control valve provided in accordance with the present invention includes: an inlet casing concentric to a spindle; an outlet casing coupled with the inlet casing, an inlet portion of the outlet casing having a countersunk edge part; a head having two notches in the surface of a cylindrical portion, the head being put into the outlet casing; and a disk shaped as a truncated cone which is continuously provided to the head, the disk coming into contact with the countersunk edge part.

The head having the notches in the cylindrical portion, which is put into the outlet casing, is put into the outlet casing so that the head is protected, and the flow rate of a fluid is controlled in terms of the cross-sectional area of an opening defined between the head and the outlet casing. The cross-sectional area of the opening is determined depending on the notches of the cylindrical portion of the head. The head is provided with the notches so that the ratio of the change in the flow rate of the fluid to the lift of the valve is small, and the relationship between the flow rate and the lift is linear. The idea of this art is similar to that of the art disclosed in the Japan Patent Application (OPI) No. 35185/89.

According to the present invention, the inlet portion of the outlet casing is provided with the countersunk edge part, with which the disk shaped as a truncated cone and having the surface made of the resin and continuous to the head comes into contact. In other words, the resin-made surface of the disk comes into contact with the countersunk edge part as a valve seat so as to ensure that the valve is completely closed. The disk, which comes into contact with the countersunk edge part, and the valve head are separately formed so that the disk functions to completely close the valve, and the valve head functions to control the flow rate of the fluid. Since countersunk edge part slightly pushes into the resin-made surface of the disk so as to be well fitted thereto, the opening between the cylindrical portion of the valve head and the outlet casing is not deformed. Since the form of the countersunk edge part which slightly pushes into the truncated-cone-shaped disk does not have an adverse effect to deteriorate the accuracy of the control of the flow rate of the fluid when the flow rate is low, the accuracy is kept high and the function of completely closing the valve is secured.

Although the valve head and the inner and the outer casings may be made of any metal, it is preferable that they are made of stainless steel. The disk shaped as a truncated cone and having the surface made of the resin may be either entirely made of the resin or made of a metal piece and the resin coating the surface of the piece. It is preferable that the resin is produced from tetrafluoroethylene. The flow control valve may be driven either electrically or pneumatically. It is preferable that an AC servomotor, a DC servomotor, a step motor or a pulse motor is used for the electric driving of the valve.

DETAILED DESCRIPTION OF THE PREFERRED EMBODIMENTS

An embodiment of the present invention is hereafter described. However, the present invention is not confined to the embodiment.

Figure 1:
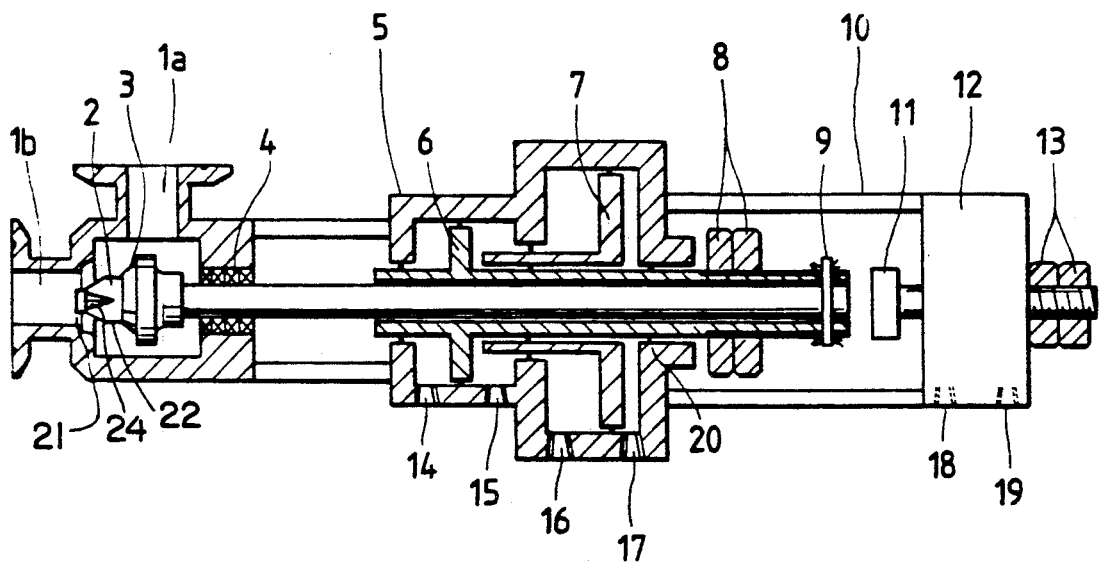
FIG. 1 is a longitudinally sectional view of a flow control valve which is an embodiment of the present invention.
Figure 2B:
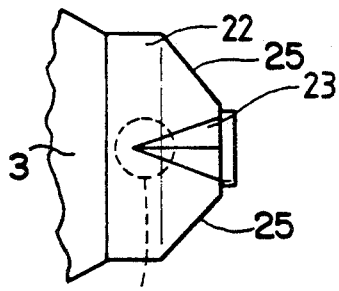
FIG. 2(b) is a left side view of the head.
Figure 2A:
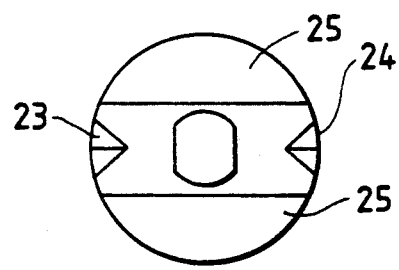
FIG. 2(a) is a plan view of the head of the valve.
Figure 2C:
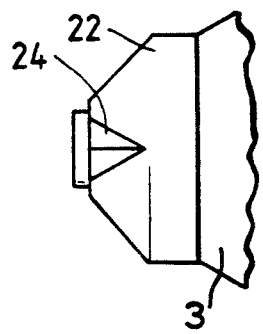
FIG. 2(c) is a right side view of the head.
Figure 2D:
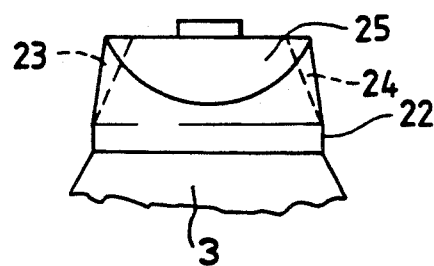
FIG. 2(d) is a front view of the head.
Figure 3:
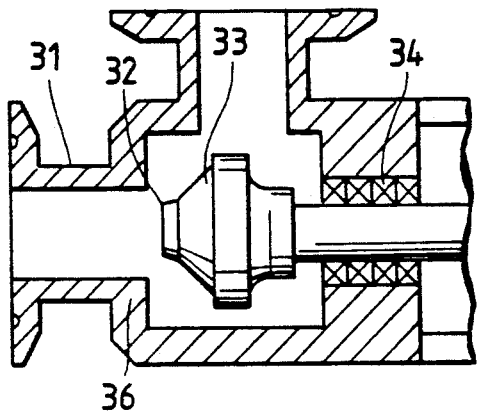
FIG. 3 is a longitudinally sectional view of a conventional flow control valve.
Figure 4:
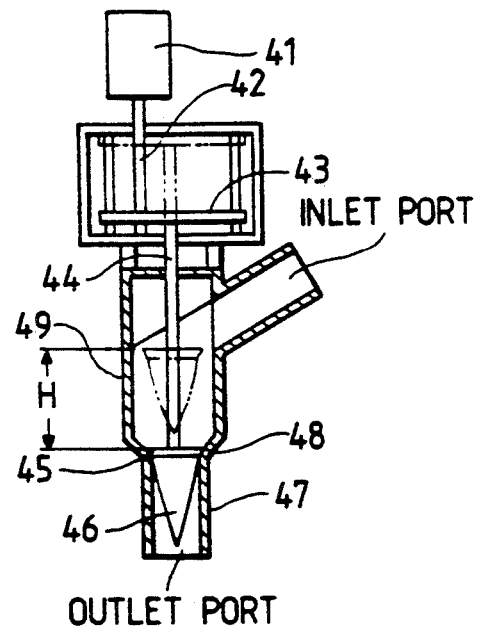
FIG. 4 is a longitudinally sectional view of a flow control valve disclosed in the Japan Patent Application (OPI) No. 35185/89.
Figure 5A:
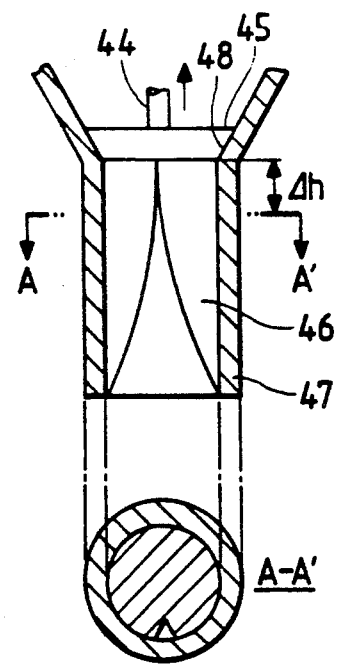
FIGS. 5(a) and 5(b) are longitudinally sectional views showing the positional relationship between the head and outlet casing of the valve shown in FIG. 4.
Figure 5B:
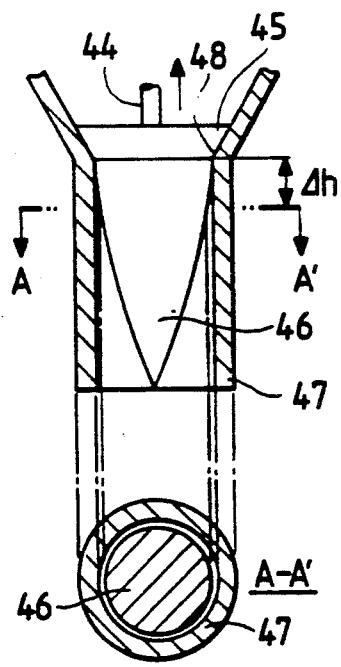

FIGS. 1 and 2 show a flow control valve which is the embodiment. In the valve, the cylindrical portion 22 of a valve head 2, which is put into an outlet casing 1b, has two notches 23 and 24 which are located opposite each other across the axis of the cylindrical portion, as shown in FIG. 2. The notch 23 is larger in length than the other notch 24 so that a fluid can be controlled to a low flow rate by the valve. The cylindrical portion 22 includes cut parts 25 between the notches 23 and 24 so that the fluid can be controlled to a high flow rate by the valve. The inlet portion of the outlet casing 1b has a countersunk edge part 21, with which a disk 3 made of a resin and shaped as a truncated cone comes into contact so that the countersunk edge part serves as a valve seat. The countersunk edge part 21 and the disk 3 function to completely close the flow control valve. The outlet casing 1b and the cylindrical portion 22 having the notches 23 and 24 function to control the flow rate of the fluid. The function of the complete closure of the valve and the function of the control of the flow rate of the fluid are thus made independent of each other.

The flow control valve is described as a whole from now on. The valve includes an actuator made of three pneumatic cylinders in combination so that a flow rate control head unit, which is composed of the valve head 2 and the disk 3 as shown in FIG. 1 and can be moved by the actuator, can be stopped in two positions for the full opening and complete closure of the valve, another position for the low degree of opening thereof between the former positions, and yet another position for the intermediate degree of opening thereof between the former positions. The valve can thus be put in four degrees of opening, i.e. three degrees of opening and a complete closure. When compressed air is applied to compressed air inlet/outlet ports 14 and 18 and air is discharged from compressed air inlet/outlet ports 15, 16, 17 and 19, the valve is fully opened. After that, when compressed air is applied to the port 14 and air is discharged from the ports 15, 16 and 17 as compressed air is applied to the port 19 and air is discharged from the port 18, the valve is put in the intermediate degree of opening, which can be modulated by using a stopper position adjusting nut 13, a pneumatic cylinder 12 and a stopper 11. After that, when compressed air is applied to the port 14 and air is discharged from the ports 15 and 16, the valve is put in the low degree of opening, which can be modulated by using a stopper position adjusting nut 8. At that time, although a small special rod 6 and a large special rod 7 push each other, the flow rate control head unit 2 and 3 is moved to the position for the low degree of opening of the valve because the latter rod is larger in pressure-receiving cross-sectional area than the former rod. After that, when compressed air is applied to the port 15 and air is discharged from the port 14, the valve is completely closed. It is also possible that above sequence is reversed. When compressed air is applied to the port 14 and air is discharged from the port 15, the valve is put in the low degree of opening. After that, when air is discharged from the port 17, the valve is put in the intermediate degree of opening. After that, when compressed air is applied to the port 18 and air is discharged from the port 19, the valve is fully opened. Furthermore, when the valve closed completely is to be fully opened at once, compressed air is applied to the ports 14 and 18 and air is discharged from the ports 15, 16, 17 and 19.

A position-controlled actuator, a servomotor or the like may be provided instead of the three pneumatic cylinders in order to optionally and minutely control the flow rate of the fluid.

A flow control valve provided in accordance with the present invention produces effects as mentioned below.

(1) The flow rate of a fluid can be controlled not only to be low, but also in a wide range by the single valve.

(2) Even if the resin-made disk of the valve is deformed, the flow rate does not change, so that the flow rate is stably controlled. Besides, the function of the complete closure of the valve is secured.

Thus, the installation space for the valve and the equipment cost thereof are diminished.

What is claimed is:

1. A flow control valve comprising:
   a valve spindle;
   a metal inlet casing concentric with said valve spindle;
   a metal outlet casing coupled to said inlet casing, an inlet portion of said outlet casing having a countersunk edge portion; and
   a valve head coupled to an end of said valve spindle, said valve head comprising:
      a cylindrical portion having a surface cut by a pair of notches disposed opposite one another across a longitudinal axis of said valve head and a pair of generally flat cut parts disposed opposite one another and between said notches, one of said notches being longer than the other of said notches in said longitudinal direction of said valve head, a surface of said cut parts extending obliquely to said longitudinal axis of said valve head, and a disk portion formed upstream of and continuous with said cylindrical portion, said disk portion being shaped as a truncated cone, at least a surface portion of said disk portion being made of a resin material, said disk portion being sealed against said countersunk edge portion of said outlet casing when said valve is closed.

2. The flow control valve of claim 1, further comprising means for driving said valve spindle so as to position said valve head at a desired position between a fully opened position and a fully closed position.

3. The flow control valve of claim 1, wherein said inlet casing and said outlet casing are made of stainless steel.

4. The flow control valve of claim 1, wherein said resin material of said disk portion is tetrafluoroethylene.

5. The flow control valve of claim 1, wherein said disk portion is formed entirely of said resin material.

6. The flow control valve of claim 1, wherein only said surface portion of said disk portion is formed of said resin material, while remaining portion of said disk portion and said cylindrical portion are made of metal.

* * * * *